US011128108B1

(12) United States Patent
Hwang et al.

(10) Patent No.: US 11,128,108 B1
(45) Date of Patent: Sep. 21, 2021

(54) SPARK PLUG WITH DRAINAGE FEATURES IN TERMINAL

(71) Applicants: DENSO International America, Inc., Southfield, MI (US); Denso Corporation, Kariya (JP)

(72) Inventors: Jeongung Hwang, Northville, MI (US); Harrison Boll, Grosse Pointe Farms, MI (US); Christopher Thomas, Oakland, MI (US)

(73) Assignees: DENSO INTERNATIONAL AMERICA, INC., Southfield, MI (US); DENSO CORPORATION

( * ) Notice: Subject to any disclaimer, the term of this patent is extended or adjusted under 35 U.S.C. 154(b) by 0 days.

(21) Appl. No.: 17/147,558

(22) Filed: Jan. 13, 2021

Related U.S. Application Data

(60) Provisional application No. 63/028,607, filed on May 22, 2020.

(51) Int. Cl.
*H01T 21/02* (2006.01)
*G06K 1/12* (2006.01)
*H01T 13/20* (2006.01)
*F02P 13/00* (2006.01)
*H01T 13/14* (2006.01)

(52) U.S. Cl.
CPC .............. *H01T 13/20* (2013.01); *F02P 13/00* (2013.01); *H01T 13/14* (2013.01)

(58) Field of Classification Search
CPC ......... H01T 13/36; H01T 13/20; H01T 21/02; H01T 13/34; H01T 13/38; H01T 13/39; F02P 13/00; F23Q 7/001
See application file for complete search history.

(56) References Cited

U.S. PATENT DOCUMENTS 7,723,906 B2 * 5/2010 Kadowaki ............... H01T 13/38 313/143
10,468,859 B2 11/2019 Maki
2015/0007785 A1 * 1/2015 Hosokawa ................ F01P 3/14 123/41.79
2016/0251069 A1 * 9/2016 Etherington-Smith ...................... F02N 19/00 123/188.1

FOREIGN PATENT DOCUMENTS

JP 2019003722 A 1/2019

* cited by examiner

*Primary Examiner* — Tracie Y Green
(74) *Attorney, Agent, or Firm* — Dickinson Wright PLLC

(57) ABSTRACT

A spark plug for an automotive engine includes a shell housing, and an insulator within the shell housing but extending axially beyond the shell housing. A terminal, referred to herein as a cup post terminal, is fixed to the proximal end of the insulator. The cup post terminal includes an engagement surface configured to engage an ignition coil spring for energy transfer to initiate a spark. The cup post terminal includes a sidewall extending axially from the engagement surface. The sidewall cooperates with the engagement surface to define a pocket for the ignition coil spring. The sidewall can have drainage openings to allow oil or contaminants to escape the pocket and drain away from the engagement between the engagement surface and the ignition coil spring. The engagement surface can also be sloped to facilitate the drainage toward the drainage openings.

20 Claims, 6 Drawing Sheets

SPARK PLUG WITH DRAINAGE FEATURES IN TERMINAL

CROSS-REFERENCE TO RELATED APPLICATIONS

This application claims the benefit of U.S. provisional application Ser. No. 63/028,607 filed May 22, 2020, the disclosure of which is hereby incorporated in its entirety by reference herein.

TECHNICAL FIELD

The present disclosure relates to a spark plug having a terminal with drainage features to facilitate drainage of oil or contaminants.

BACKGROUND

Spark plugs typically include a terminal located at the proximal side of the spark plug. The spark plug terminal is a critical point of interface between the spark plug and an ignition coil spring. Specifically, the ignition coil spring mates to the spark plug terminal, creating an interface for energy transfer. This interface can be prone to collection of engine oil or contaminants that have the possibility to interfere with the energy transfer at the interface.

SUMMARY

According to one embodiment, a spark plug includes a shell housing extending along an axis and having a distal end and a proximal end. The spark plug includes an insulator having a distal end extending distally beyond the distal end of the shell housing, and a proximal end extending proximally beyond the proximal end of the shell housing. The spark plug includes a cup post terminal fixed to the proximal end of the insulator, the cup post terminal having an engagement surface configured to engage an ignition coil spring, and a sidewall extending proximally from the engagement surface and cooperating with the engagement surface to define a pocket for the ignition coil spring. The sidewall has at least one drainage opening extending radially therethrough to allow oil or contaminants to drain out of the pocket through the at least one drainage opening.

According to an embodiment, a spark plug includes a shell housing extending along a central axis and having a distal end and a proximal end. The spark plug includes an insulator extending along the central axis and having a distal end extending distally beyond the distal end of the shell housing, and a proximal end extending proximally beyond the proximal end of the shell housing. The spark plug includes a cup post terminal fixed to the proximal end of the insulator. The cup post terminal includes an engagement surface configured to engage an ignition coil spring, and a sidewall extending proximally from the engagement surface and annularly about the axis. At least a portion of the engagement surface extends at an oblique angle relative to the central axis.

According to an embodiment, a spark plug includes a terminal having an engagement surface configured to engage an ignition coil spring, the terminal further having a sidewall extending proximally from the engagement surface and cooperating with the engagement surface to define a pocket for the ignition coil spring. The sidewall defines at least one drainage opening extending radially therethrough, and the engagement surface is tapered to guide oil or contaminants toward the at least one drainage opening.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
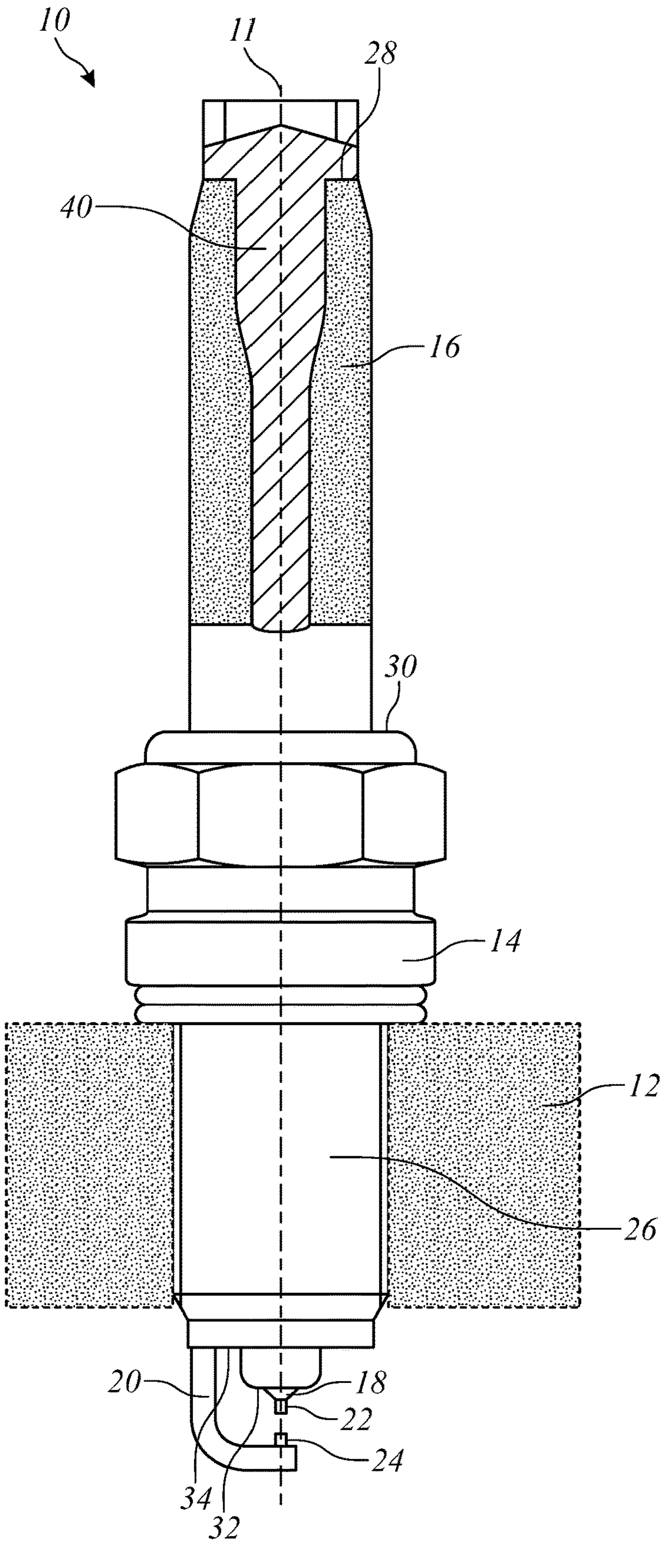
FIG. 1 is a side view of a spark plug with a cross-section taken through a portion of an insulator and cup post terminal of the spark plug, according to an embodiment.

FIG. 1 shows an overall structure of a spark plug 10 according to an embodiment of the present disclosure. The spark plug 10 is configured for use with internal combustion engines of the type used in automotive vehicles such as cars, trucks, sports-utility vehicles (SUVs), vans, and the like. The spark plug 10 can be installed to an internal combustion engine by inserting it into a combustion chamber through a threaded bore provided in the engine block 12 which forms the combustion chamber together with other components of the engine, such as the cylinder and piston.

The spark plug 10 extends from a proximal end to a distal end along a central axis 11, and generally includes a metal shell housing 14, an insulator 16, a center electrode 18 running along longitudinally along the center of the spark plug 10, a ground electrode 20, a first metal chip 22, and a second metal chip 24. The metal shell housing 14 can be made of an electrically conductive material, such as, for example, a low-carbon steel. The metal shell housing 14 can be a tubular or hollow structure having a threaded portion 26 on its outer periphery for fitting the spark plug 10 into the threaded bore of the engine block 12. The metal shell housing 14 is configured to withstand the torque of tightening the spark plug 10 into the engine block 12, remove excess heat from the spark plug 10, and transfer the excess heat to the engine block.

The insulator 16 can be installed in the shell housing 14 and is fixedly and coaxially supported therein along the central axis. The insulator 16 can be made of a porcelain material such as, for example, alumina ceramic. The insulator 16 may have a first end or proximal end 28 that protrudes outwardly from a proximal end 30 of the shell housing 14, and a second end or distal end 32 that protrudes outwardly from a cylindrical distal end 34 of the shell housing 14. The length of the insulator 16 can be selected to provide an appropriate length for the spark plug 10. In some embodiments, an air pocket is formed between the inner surface of the shell housing 14 and an outer surface of the insulator 16.

The insulator 16 can have an axial bore for fixedly retaining and encircling the center electrode 18 in an electrically insulated state. The first metal chip 22 may be made of a noble metal, and may be secured (e.g., welded) to a distal end of the center electrode 18. The center electrode 18 may be cylindrical in shape and can be made to include a highly heat conductive core material and a highly heat resistant and corrosion-resistant cladding material. The ground electrode 20 may be joined to and extend from the distal end 34 of the shell housing 14, or a separate shroud member attached or joined thereto. The second metal chip 24 can also be made of a noble metal, and may be secured (e.g., welded) to the ground electrode 20 at a location such that it faces the first metal chip 22. A predetermined spark gap is established between the first metal chip 22 and the second metal chip 24 where a spark can ignite the fuel in the engine cylinder.

Spark plugs typically include a terminal located at the proximal side thereof. The spark plug terminal is a critical point of interface between the spark plug and an ignition coil spring. Specifically, the ignition coil spring mates to the spark plug terminal, creating an interface for energy transfer. This interface can be prone to collection of engine oil or contaminants that have the possibility to interfere with the energy transfer at the interface.

Therefore, according to various embodiments described herein, the spark plug 10 includes a terminal 40 also referred to as a cup post terminal, button top, or cup terminal. The cup post terminal 40 is designed and configured to relieve such collection of oil or contaminants. For example, in some embodiments, the cup post terminal 40 has drainage openings or passages to allow the oil or contaminants to escape the cup post terminal 40. In some embodiments, the cup post terminal is inclined toward the drainage openings or passages to facilitate the drainage.

Figure 2A:
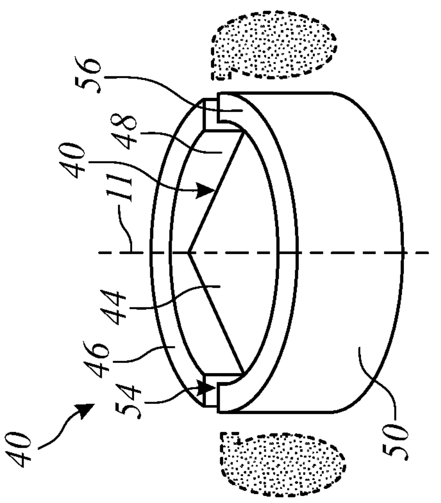
FIG. 2A is a perspective view of a cup post terminal of the spark plug, according to one embodiment.
Figure 2B:
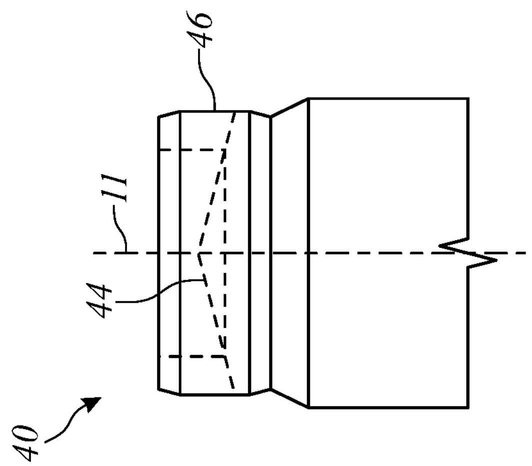
FIGS. 2B-2C are side views of the cup post terminal of FIG. 2A.
Figure 2C:
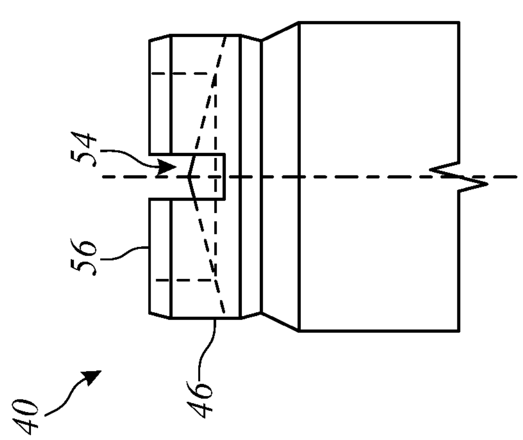
Figure 3A:
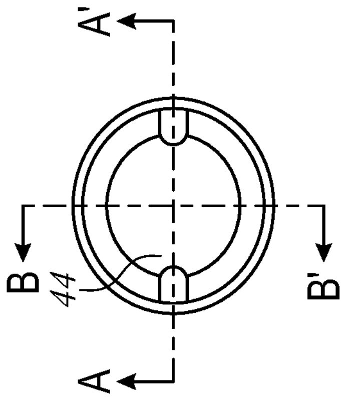
FIG. 3A is a top view of the cup post terminal of FIG. 2A.
Figure 3B:
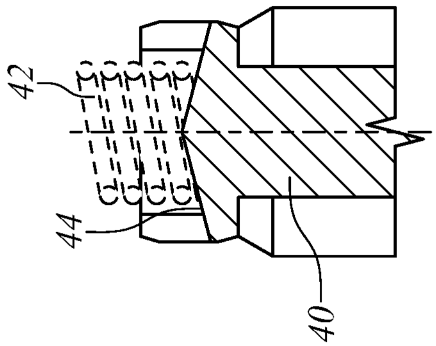
FIG. 3B is a cross-sectional view taken along line A-A of FIG. 3A.
Figure 3C:
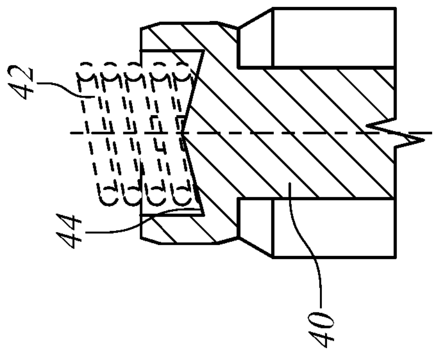
FIG. 3C is a cross-sectional view taken along line B-B of FIG. 3A.

FIG. 1 shows the spark plug 10 having a cup post terminal 40 according to an embodiment. FIGS. 2-3 show the cup post terminal 40 in more detail and from different views. In particular, FIG. 2A shows a proximal portion of the cup post terminal 40 in isolation, FIGS. 2B-2C show the cup post terminal 40 attached to the proximal end 28 of the insulator 16, FIG. 3A shows a top view or proximal plan view of the cup post terminal 40, and FIG. 3B-3C show a cross-section of the cup post terminal 40 engaged with an ignition coil spring 42.

Referring to FIGS. 2A-3C, the cup post terminal 40 includes an engagement surface 44 extending about the central axis 11. The engagement surface 44 faces the proximal direction, and is configured to make contact with and engage the ignition coil spring 42. The contact between the ignition coil spring 42 and the engagement surface 44 creates an interface for energy transfer from the ignition coil to the distal end of the spark plug 10 for creating a spark between the center electrode 18 and the ground electrode 20.

The cup post terminal 40 also includes a sidewall 46. The sidewall 46 may extend annularly about the central axis 11, having an inner surface 48 facing the axis 11 and an outer surface 50 facing away from the axis 11. The sidewall 46 and the engagement surface 44 may cooperate to define a pocket 52 within the cup post terminal 40. The pocket 52 is configured to retain a distal portion of the spring 42, as shown in FIGS. 3B-3C. In particular, the engagement surface 44 contacts the spring 42, and the inner surface 48 of the sidewall 46 retains the spring 42 and inhibits the spring 42 from dislodging from the cup post terminal 40.

The sidewall 46 also has one or more drainage openings 54 extending therethrough. The drainage opening 54 may be referred to or include a relief channel, slot or hole, and enables oil or other contaminants to escape the pocket 52. Collection of oil or contaminants in the pocket 52 can degrade the interface between the ignition coil spring 42 and the engagement surface 44. The drainage opening 54 allows the oil or contaminants to exit the pocket and be removed from this critical interface, improving the longevity and performance of the spark plug.

To facilitate the draining of the oil or contaminants from the pocket 52, the engagement surface 44 may be tapered or angled toward the drainage openings 54. In the embodiment shown in FIGS. 2A-3C, the engagement surface 44 extends at an oblique angle relative to the central axis 11. For example, the engagement surface 44 may extend at an angle $\theta$ relative to a perpendicular of the axis 11. This sloped, tapered nature of the engagement surface 44 allows the oil or contaminants to drain radially outward from the axis 11 and in the distal direction and toward the drainage openings 54.

The drainage openings 54 may be slots formed into the sidewall 46 during manufacturing (e.g., the slots are formed simultaneous with the sidewall 46). The slots may extend from a proximally-facing end surface 56 of the sidewall 46, and toward the distal direction toward the engagement surface 44, as shown in FIG. 2A. The drainage openings 54 (e.g., slots) may extend only partially toward the engagement surface 44, or may extend entirely to the engagement surface 44 and intersect the engagement surface 44 such that the oil or contaminants can slide directly from the engagement surface 44 and out through the drainage openings 54.

Figure 4A:
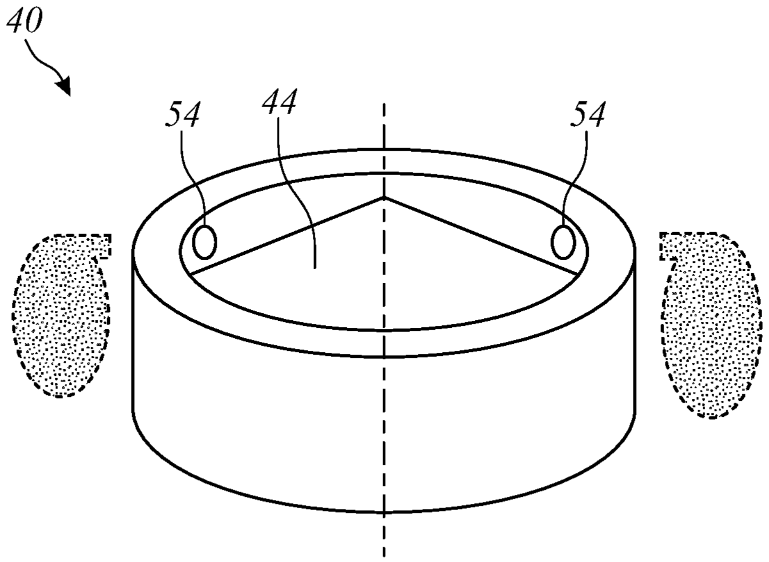
FIG. 4A is a perspective view of a cup post terminal according to another embodiment.
Figure 4B:
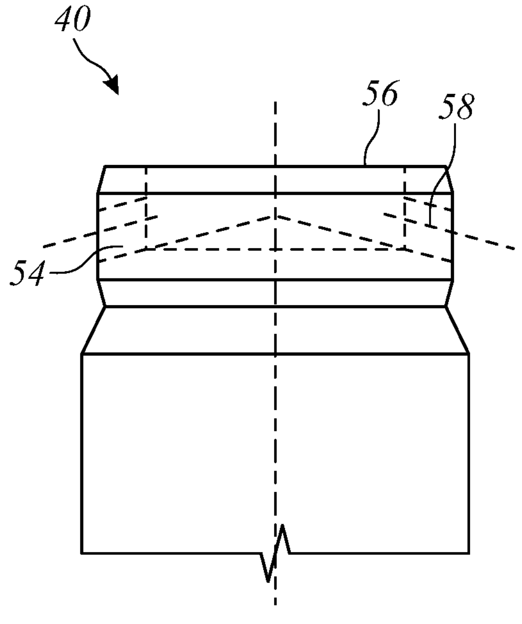
FIGS. 4B-4C are side views of the cup post terminal of FIG. 4A.
Figure 4C:
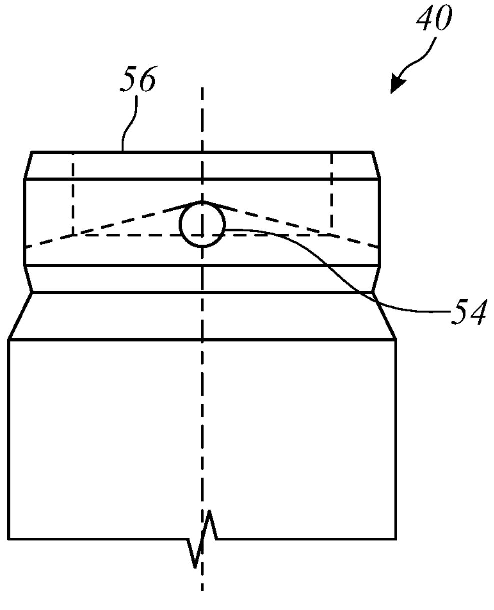

Referring to FIGS. 4A-4C, the drainage opening 54 may also be a through hole. The through hole may be bored, drilled, or otherwise formed into the sidewall 46 after formation of the sidewall 46. The through holes may be located axially between the proximally-facing end surface 56 and the engagement surface 44. In some embodiments, the through holes are located at the intersection of the proximally-facing end surface 56 and the engagement surface 44. As can be seen in FIG. 4B, the holes can be bored or drilled such that they extend at an angle parallel with the angle Θ such that a distal interior surface of the holes can be continuous with the engagement surface 44. In other words, a central axis 58 of the hole can be parallel to the engagement surface 44.

Figure 5A:
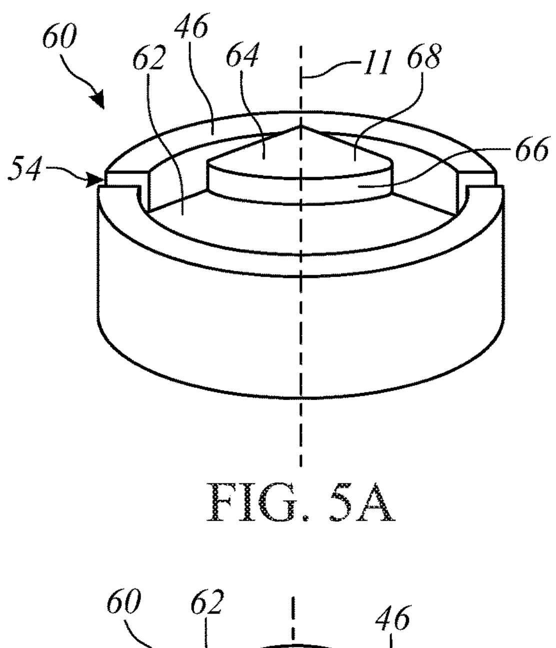
FIG. 5A is a perspective view of a cup post terminal according to another embodiment.
Figure 5B:
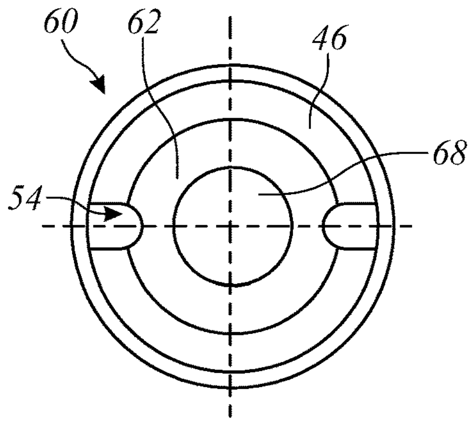
FIG. 5B is a top view of the cup post terminal of FIG. 5A.
Figure 5C:
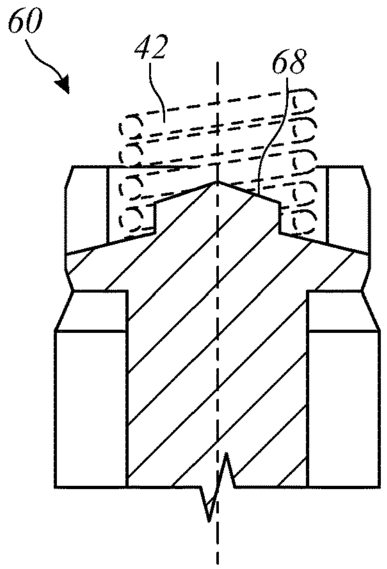
FIG. 5C is a cross-sectional view of the cup post terminal of FIG. 5A.

The cup post terminal 40 illustrated in FIGS. 1-4C can be referred to as having a "cone" design, referring to the shape of the engagement surface. FIGS. 5A-5C illustrate a cup post terminal 60 according to another embodiment. The cup post terminal 60 in this embodiment can be referred to as a "raised cone" design, as the proximal side of the cup post terminal 60 includes both a cone shape and a raised region within the cone, as will be described.

The cup post terminal 60 has a sidewall 46 and drainage openings 54 as in previous embodiments. The drainage openings 54 may have a width W that can vary according to the desired design. The cup post terminal 60 has an engagement surface 62 that contacts and engages the ignition coil spring 42, as in the previous embodiment. Again, the engagement surface 62 may extend at an oblique angle Θ relative to a perpendicular of the axis 11. In this embodiment, the engagement surface 62 does not extend all the way to the center of the cup post terminal 60. Instead, the cup post terminal has a raised projection 64 extending proximally from the engagement surface 62. The raised projection 64 may be located inside the ignition coil spring 42, as shown in FIG. 5C. Thus, when assembled, the ignition coil spring 42 is located radially between the raised projection 64 and the sidewall 46. This can help locate the ignition coil spring 42 during assembly.

The raised projection 64 may include a side surface 66 extending axially. The side surface 66 can extend axially a predetermined height H to define the overall height of the raised projection 64. The side surface 66 can extend annularly about the central axis 11, and may connect the engagement surface 62 to a cone-shaped surface 68 at the center of the cup post terminal. Thus, in this embodiment, the cup post terminal 60 has a conical surface (e.g., cone-shaped surface 68) at the center of the cup post terminal 60, and a frusto-conical surface (e.g., engagement surface 62) extending annularly about the conical surface on a different plane or axially separated from each another. The cone-shaped surface 68 may extend at an oblique angle Θ' relative to the central axis 11. The oblique angle Θ' may be parallel to, and axially offset from, the oblique angle Θ.

Figure 6A:
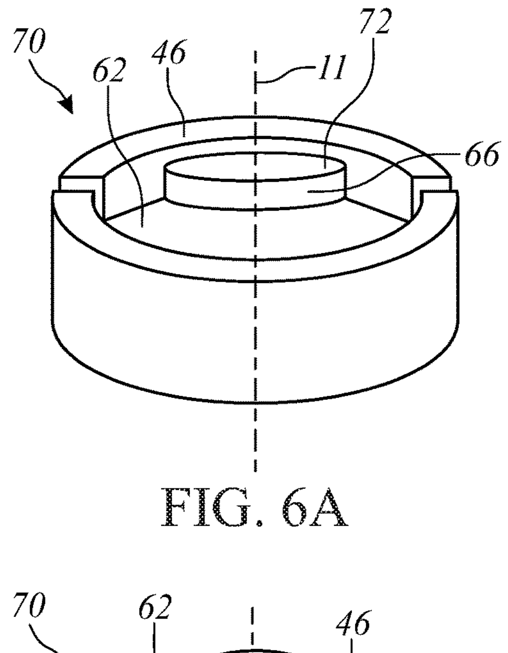
FIG. 6A is a perspective view of a cup post terminal according to another embodiment.
Figure 6B:
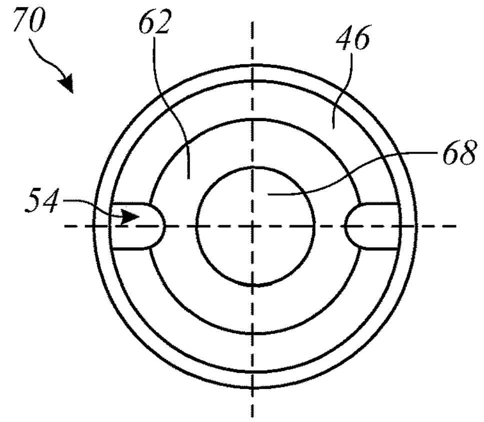
FIG. 6B is a top view of the cup post terminal of FIG. 6A.
Figure 6C:
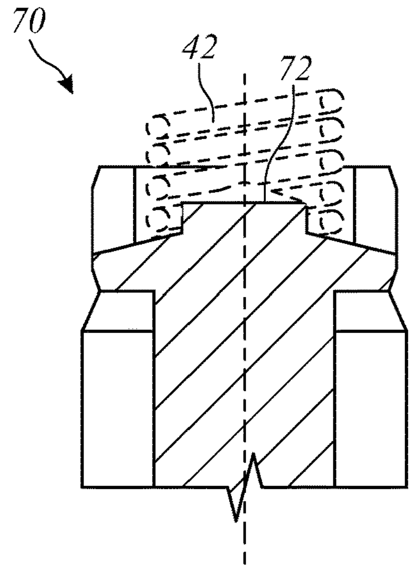
FIG. 6C is a cross-sectional view of the cup post terminal of FIG. 6A.

FIGS. 6A-6C illustrate another embodiment of a cup post terminal 70. This embodiment may be referred to as a "raised flat" design of the cup post terminal 70 because the center of the cup post terminal 70 is raised from the engagement surface 62, but is flat rather than conical. For example, the cup post terminal 70 may once again include the slanted or sloped engagement surface 62 connecting the sidewall 46 to a side surface 66 extending axially and annularly about the center axis 11. The side surface 66 leads to a raised flat surface 72 at the center of the cup post terminal 70. It can be said that the raised flat surface 72 can be the proximal end of a raised projection. The raised projection is similar to the raised projection 64 of FIGS. 5A-5C, except the raised projection in FIGS. 6A-6C ends at the proximal side with a flat surface 72 rather than a conical surface.

Figure 7A:
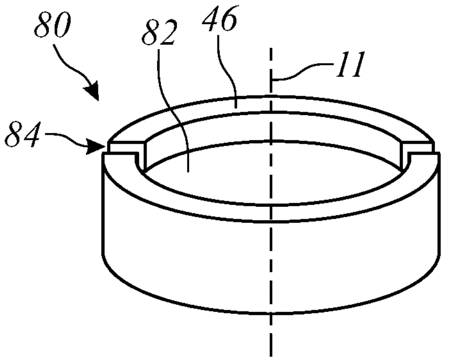
FIG. 7A is a perspective view of a cup post terminal according to another embodiment.
Figure 7B:
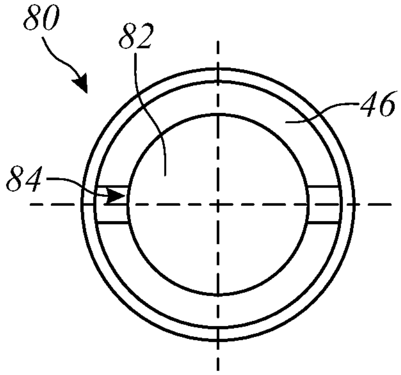
FIG. 7B is a top view of the cup post terminal of FIG. 7A.
Figure 7C:
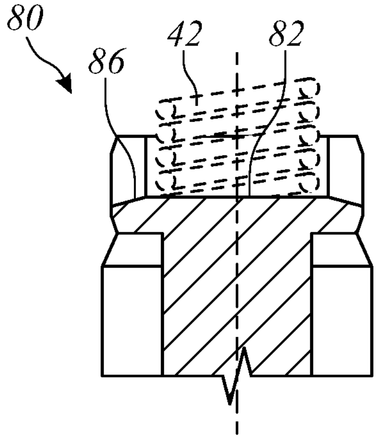
FIG. 7C is a cross-sectional view of the cup post terminal of FIG. 7A.

FIGS. 7A-7C illustrate another embodiment of a cup post terminal 80. This embodiment may be referred to as a "flat with angle" design of the cup post terminal 80 because the center of the cup post terminal 80 is flat and not raised, while the drainage openings are angled. In this embodiment, the cup post terminal 80 includes an engagement surface 82 that spans the entire interior space radially inward of the sidewall 46. In other words, the engagement surface 82 is all on a single plane and makes up the entire space within the sidewall 46, including the center of the cup post terminal 80 aligned with the center axis 11. The inner surface of the sidewall 46 can support the spring 42 from outside the spring, and help locate the spring 42 during assembly.

Once again, the sidewalls 46 are provided with drainage openings 84, similar to the drainage openings 54 described above. In this embodiment, the drainage openings 84 have a distal surface 86 that is sloped, slanted, or otherwise extending oblique relative to the axis 11. This is similar to previous embodiments illustrated, however in this embodiment, the distal surface 86 within the drainage opening 84 extends oblique relative to the axis 11 while no part of the central area within the sidewall 46 extends oblique relative to the axis 11. The angle Θ is thus between the distal surface 86 and a line perpendicular to the central axis 11.

Figure 8A:
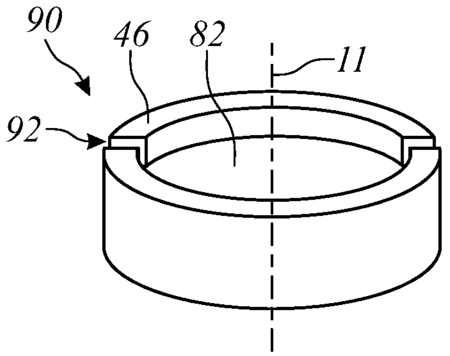
FIG. 8A is a perspective view of a cup post terminal according to another embodiment.
Figure 8B:
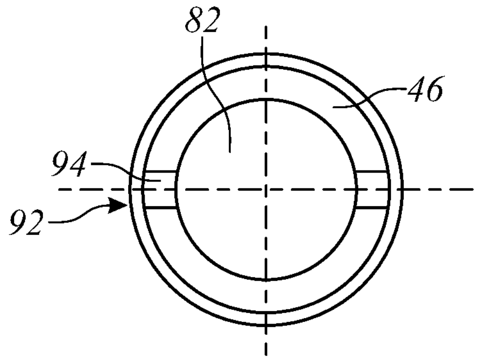
FIG. 8B is a top view of the cup post terminal of FIG. 8A.
Figure 8C:
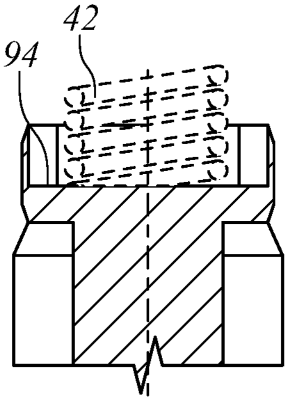
FIG. 8C is a cross-sectional view of the cup post terminal of FIG. 8A.

FIGS. 8A-8C illustrate another embodiment of a cup post terminal 90. This embodiment may be referred to as a "flat" design of the cup post terminal 90 because the center of the cup post terminal 90 is flat and not raised, as are the distal surface within the drainage openings. In particular, in this embodiment, the cup post terminal 90 includes an engagement surface 82 that once again spans the entire interior of the sidewall 46. The inner surface of the sidewall 46 can support the spring 42 from outside the spring, and help locate the spring 42 during assembly. The cup post terminal 90 also includes drainage openings 92 similar to drainage openings in prior embodiments such as drainage openings 84, except in this embodiment the drainage surface is not angled relative to the engagement surface 82. In other words, the drainage openings 92 each include a terminal surface 94 that is coplanar with the engagement surface 82, extending perpendicularly from the central axis 11. Unlike previous embodiments, no oblique angle is provided between the terminal surface 94 and any line extending perpendicular from the central axis 11.

Figure 9:
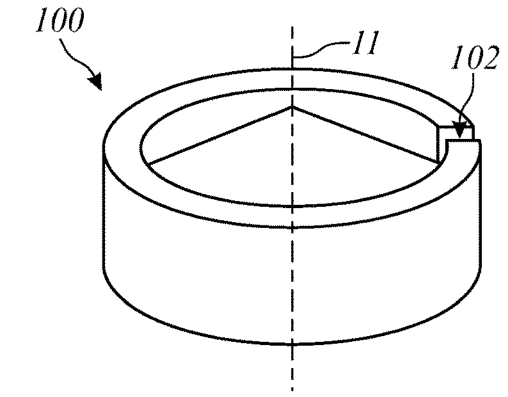
FIGS. 9-12 are perspective views of various cup post terminals illustrating different numbers and positions of drainage openings in the cup post terminals.

It should be understood that any of the embodiments described herein can be provided with any number of drainage openings. FIGS. 9-12 illustrate this point; a cup post terminal is illustrated in each of these Figures with differing numbers of drainage openings. The cup post terminal illustrated in FIGS. 9-12 is the "cone" design illustrated in the embodiment of FIG. 2, but it should be understood that different numbers of drainage openings can be provided in any of the embodiments described herein. FIG. 9 illustrates a cup post terminal 100 with a single drainage opening 102.

Figure 10:
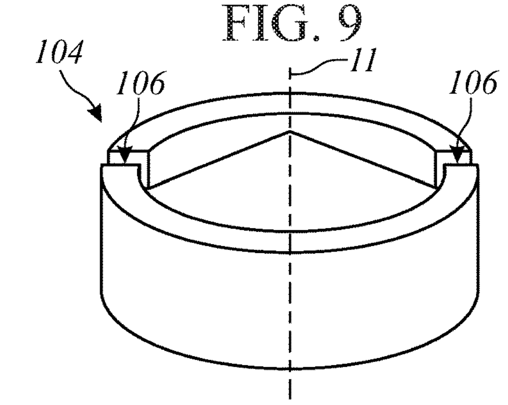

FIG. 10 illustrates a cup post terminal 104 with two drainage openings 106 in the sidewall. The drainage openings 106 are located 180 degrees from each other relative to the axis 11.

Figure 11:
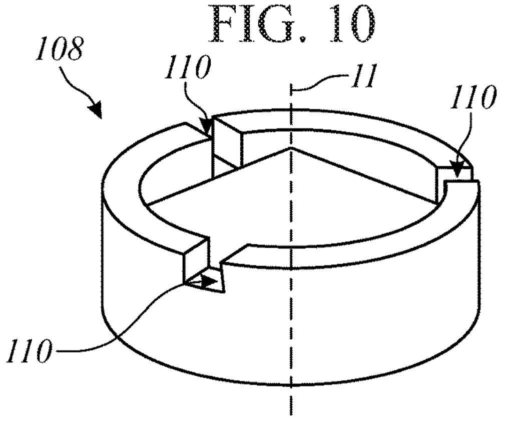

FIG. 11 illustrates a cup post terminal 108 having three drainage openings 110 in the sidewall. The drainage openings 110 may be located equidistantly about the axis 11, i.e., 120 degrees relative to each other about the axis 11.

Figure 12:
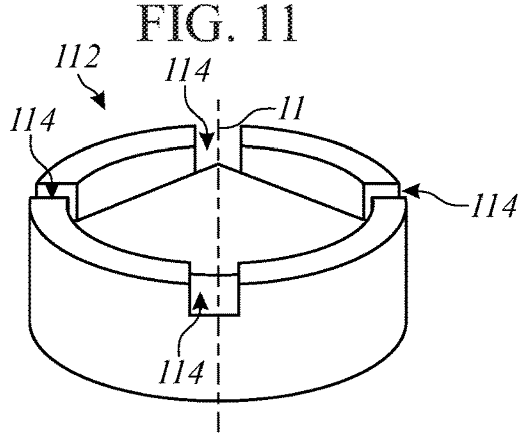

FIG. 12 illustrates a cup post terminal 112 having four drainage openings 114 in the sidewall. The drainage openings 114 may be located equidistantly about the axis 11, i.e., 90 degrees relative to each other about the axis 11.

While FIGS. 9-12 show one to four drainage openings, there can be more than four drainage openings in the cup post terminal. Also, while the drainage openings are illustrated as grooves or slots extending from the proximal-most surface of the sidewall, the drainage openings can be holes or other types of openings as previous described.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A spark plug comprising:
- a shell housing extending along an axis and having a distal end and a proximal end;
- an insulator having a distal end extending distally beyond the distal end of the shell housing, and a proximal end extending proximally beyond the proximal end of the shell housing; and
- a cup post terminal fixed to the proximal end of the insulator, the cup post terminal having
  - an engagement surface configured to engage an ignition coil spring, and
  - a sidewall extending proximally from the engagement surface and cooperating with the engagement surface to define a pocket for the ignition coil spring, the sidewall having at least one drainage opening extending radially therethrough to allow oil or contaminants to drain out of the pocket through the at least one drainage opening.

2. The spark plug of claim 1, wherein the at least one drainage opening includes a slot extending radially through the sidewall and extending distally from a proximal surface of the sidewall.

3. The spark plug of claim 1, wherein the at least one drainage opening includes a hole defined by the sidewall.

4. The spark plug of claim 1, wherein the at least one drainage opening includes a plurality of drainage openings, wherein at least two of the drainage openings are located radially opposed to each other relative to the axis.

5. The spark plug of claim 1, wherein at least a portion of the engagement surface extends oblique relative to the axis to facilitate draining of the oil or contaminants toward the at least one drainage opening.

6. The spark plug of claim 5, wherein the engagement surface is conical in shape.

7. The spark plug of claim 5, wherein the cup post terminal includes a raised projection extending proximally from the engagement surface in a center of the cup post terminal and is configured to retain the ignition coil spring radially between the raised projection and the sidewall.

8. The spark plug of claim 7, wherein the raised projection has a proximal surface that extends perpendicular to the axis.

9. The spark plug of claim 7, wherein the raised projection has a proximal surface that extends oblique relative to the axis.

10. A spark plug comprising:
- a shell housing extending along a central axis and having a distal end and a proximal end;
- an insulator extending along the central axis and having a distal end extending distally beyond the distal end of the shell housing, and a proximal end extending proximally beyond the proximal end of the shell housing; and
- a cup post terminal fixed to the proximal end of the insulator, the cup post terminal having
  - an engagement surface configured to engage an ignition coil spring, and
  - a sidewall extending proximally from the engagement surface and annularly about the central axis,
  - wherein at least a portion of the engagement surface extends at an oblique angle relative to the central axis.

11. The spark plug of claim 10, wherein the cup post terminal defines a peak located along the central axis and raised relative to the engagement surface.

12. The spark plug of claim 10, wherein the portion of the engagement surface tapers away from the central axis in a distal direction.

13. The spark plug of claim 10, wherein the cup post terminal includes a raised projection extending proximally from the engagement surface in a center of the cup post terminal.

14. The spark plug of claim 13, wherein the raised projection has a proximal surface that extends perpendicular to the axis.

15. The spark plug of claim 13, wherein the raised projection has a proximal surface that extends oblique relative to the axis.

16. The spark plug of claim 10, wherein the sidewall cooperates with the engagement surface to define a pocket to receive the ignition coil spring, and the sidewall includes at least one drainage opening extending radially therethrough to allow oil or contaminants to drain out of the pocket through the at least one drainage opening.

17. The spark plug of claim 16, wherein the at least one drainage opening is located at an intersection of the sidewall and the engagement surface.

18. The spark plug of claim 16, wherein the sidewall ends at a proximal end surface, and wherein the at least one drainage opening includes a slot extending distally from the proximal end surface.

19. The spark plug of claim 18, wherein the slot extends distally to the engagement surface.

20. A spark plug comprising:
- a terminal having an engagement surface configured to engage an ignition coil spring, the terminal further having a sidewall extending proximally from the engagement surface and cooperating with the engagement surface to define a pocket for the ignition coil spring;
- wherein the sidewall defines at least one drainage opening extending radially therethrough, and the engagement surface is tapered to guide oil or contaminants toward the at least one drainage opening.

* * * * *